April 6, 1948.  I. F. DAVIDSON  2,439,079
TRANSMISSION
Original Filed May 15, 1944   3 Sheets-Sheet 1
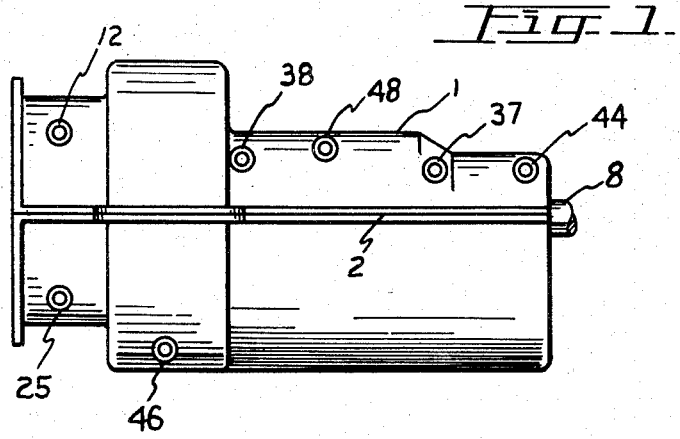
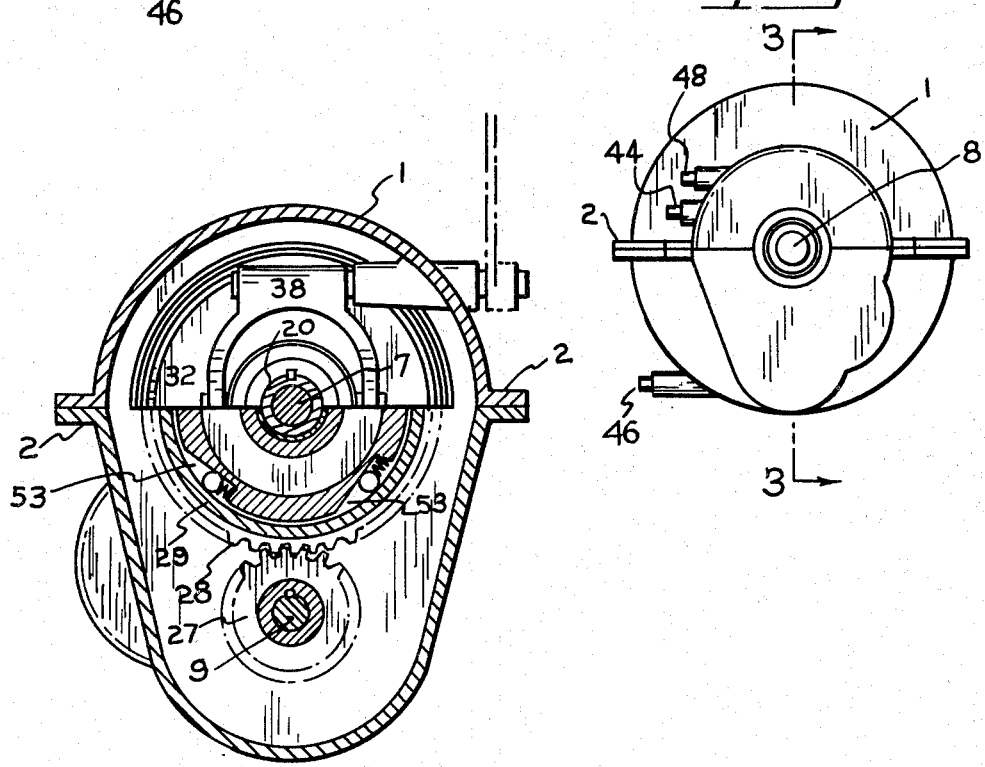
INVENTOR.
ISAAC F. DAVIDSON
BY
ATTORNEY

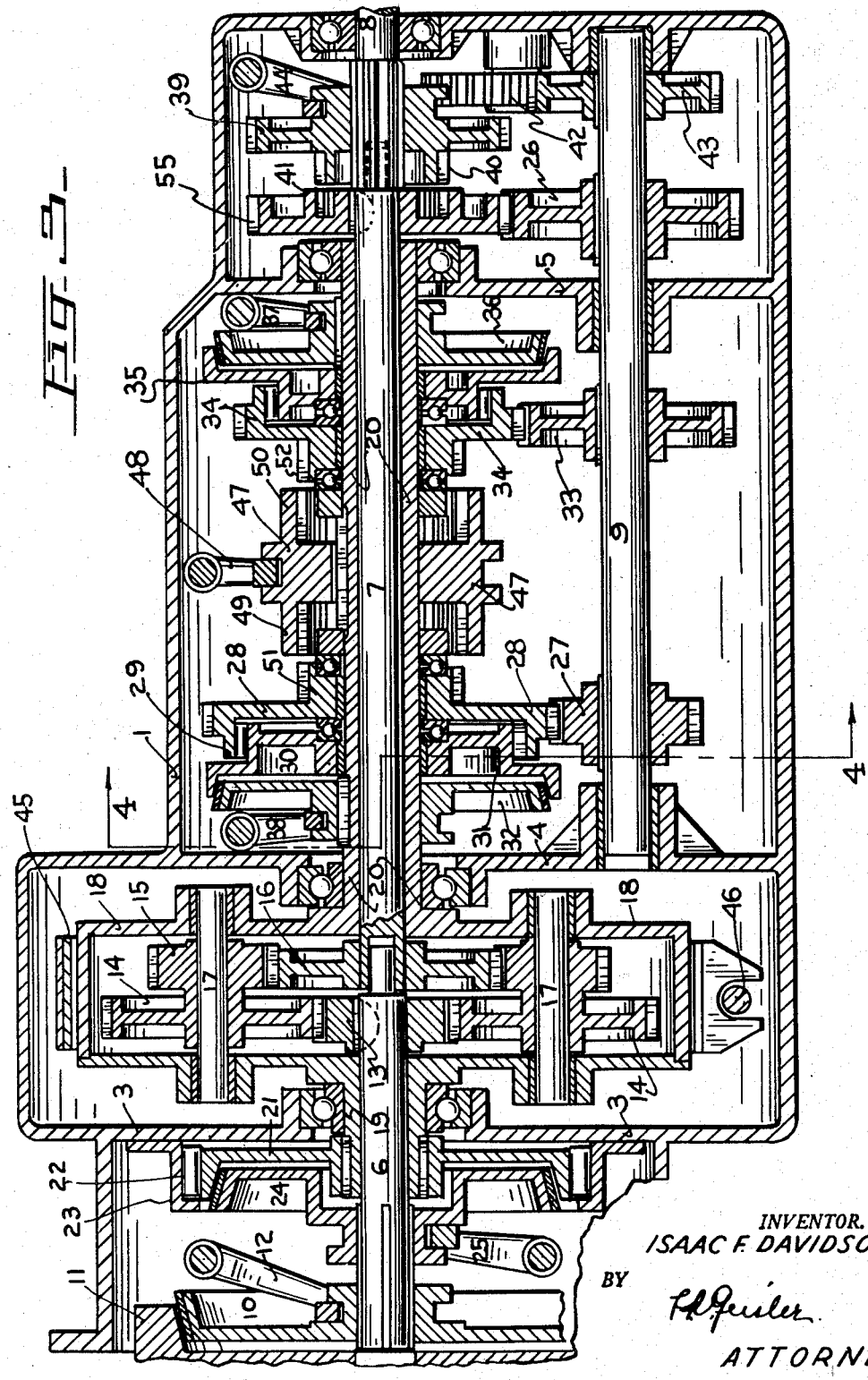

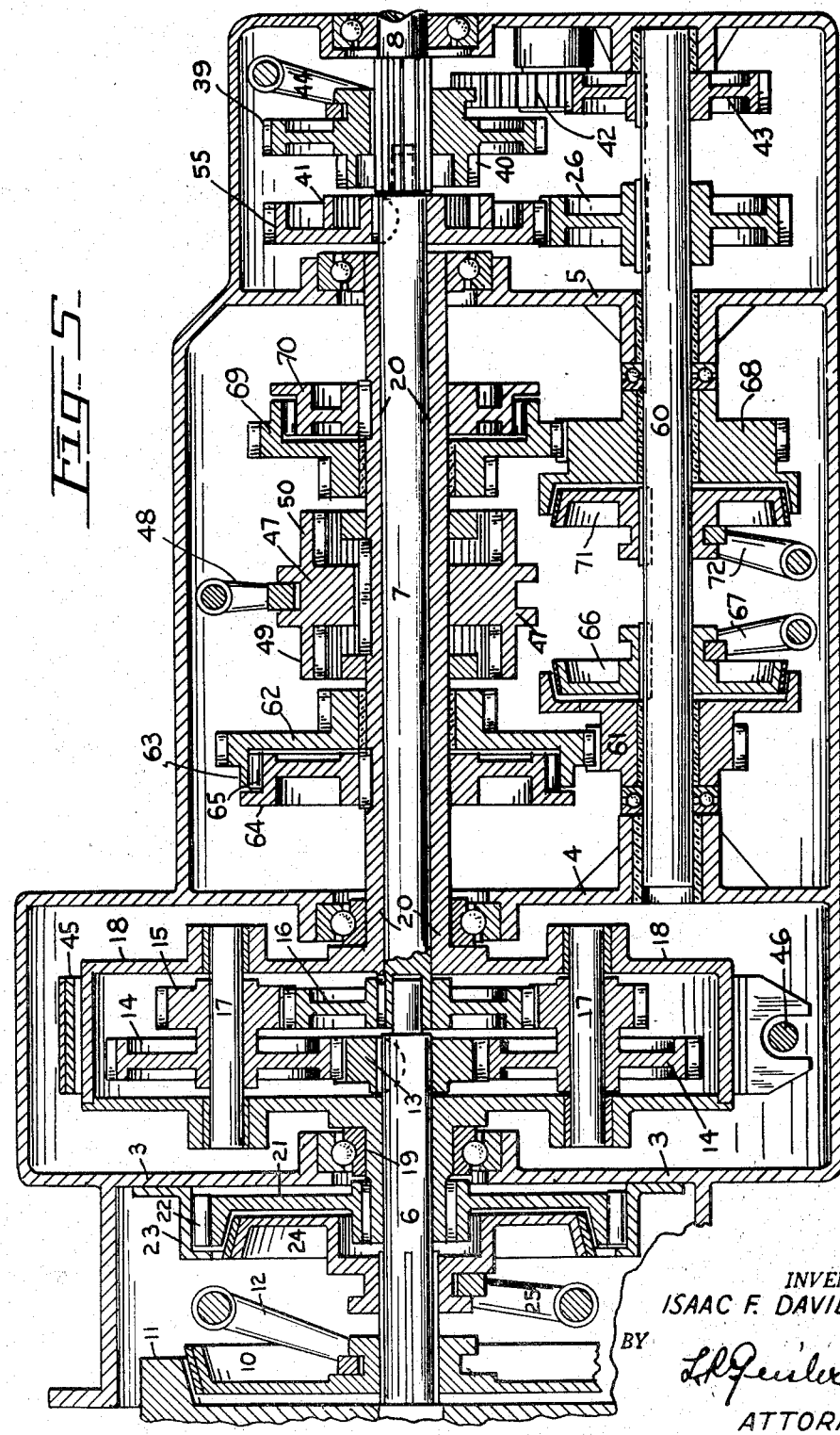

Patented Apr. 6, 1948

2,439,079

UNITED STATES PATENT OFFICE 2,439,079

TRANSMISSION

Isaac F. Davidson, Portland, Oreg.

Continuation of application Serial No. 535,665, May 15, 1944. This application May 7, 1946, Serial No. 667,884

13 Claims. (Cl. 74—328)

This application is a continuation of my application Serial No. 535,665, filed under date of May 15, 1944, now abandoned, and entitled "Clutch transmission."

My invention relates in general to transmissions for automotive vehicles, particularly vehicles such as heavy trucks in which a number of speeds are required.

My invention relates especially to caterpillar tractors and vehicles of that type in which momentum of the vehicle is apt to cease instantly the moment a clutch is thrown out, thus making it difficult to shift to a higher gear when endeavoring to increase the vehicle speed.

In most automotive vehicles sufficient momentum is obtainable at low speed to enable a shift to be made to a higher speed in the usual manner by throwing out the clutch. However, under some circumstances, particularly with tractors of the caterpillar type, it may be impossible to obtain sufficient momentum at a low speed to enable a change to a higher speed to be made without such immediate loss of momentum as to render the higher speed gear useless, and causing the engine to be stalled when the higher speed gear does become engaged. An example of such a condition would occur with a caterpillar tractor equipped with ordinary clutch transmission and travelling up an incline.

One of the objects of this invention is to provide an improved gear transmission in which ordinary clutches are used which will enable the vehicle to continue to be driven at one speed while a shift is being made to a higher speed, so that even under extreme conditions the momentum of the vehicle can not cease during the interval required to change from one speed to another.

Another object of this invention is to provide a transmission in which several different driving speeds may be successively attained without at any time requiring the motor to become disengaged from the transmission.

A further object of this invention is to provide a simplified transmission which will permit the vehicle to be driven either forward or in reverse direction with the same number of speed changes.

A still further object is to provide a transmission employing the same means for changing from one speed to another, without disengaging the vehicle motor, regardless of whether the vehicle is being driven in a forward or reverse direction, and thus insuring maintenance of minimum momentum of the vehicle during all periods of speed change regardless of the direction of vehicle travel.

An additional object of the present invention is to provide a transmission of the type above indicated which will also serve as a control and regulator for the vehicle speed when the vehicle is coasting down grade, either in forward or reverse direction, enabling changes in coasting speeds to be made and regulated coasting speed to be maintained in the same general manner as speeds are maintained when the vehicle is being driven by the motor, thus making the control of the vehicle drive complete as well as flexible under all conditions of normal operation.

The above objects and other advantages I attain by a relatively simple gear transmission including a plurality of clutch mechanisms arranged in the manner hereinafter briefly described with reference to the accompanying drawings.

In the drawings:

Fig. 1 is a side elevation of the entire housing in which the clutch transmission is mounted;

Fig. 2 is an end elevation of the same transmission housing taken from the right hand side of Fig. 1;

Fig. 3 is an enlarged sectional view of the clutch transmission taken longitudinally through the center and thus corresponding to the line 3—3 of Fig. 2;

Fig. 4 is a transverse section drawn to a smaller scale than Fig. 3 and corresponding to the staggered section line 4—4 of Fig. 3; and Fig. 5 is a longitudinal section similar to Fig. 3 but illustrating an optional arrangement of some of the individual elements.

The housing, indicated in general by the reference character 1, and preferably formed in upper and lower composite sections terminating in lateral flanges 2 enabling the two sections to be bolted together (Figs. 1, 2 and 4), is divided into a series of compartments by the transverse walls 3, 4 and 5 (Fig. 3). These walls have openings through which the driven shaft extends and are provided with suitable bosses for supporting various bearings as shown in Fig. 3.

The driven shaft comprises three separate parts or sections 6, 7 and 8 which are mounted in axial alinement and which are adapted to be connected by means hereinafter explained. A counter shaft 9 is mounted for rotation below the driven shaft and extends parallel thereto.

A friction clutch disk 10 is mounted for sliding but non-rotatable movement on the first section 6 of the driven shaft and is adapted to be brought into frictional engagement with the fly wheel 11 of the vehicle motor. The clutch disk 10 is moved into or out of engagement with the fly wheel 11 by the usual lever or shift fork 12. At all times during the operation of the transmission in the driving of the vehicle this clutch disk 10 is in engagement with the motor fly wheel and therefore, under normal operation, and regardless of the speed or direction of travel of the vehicle, the section 6 of the driven shaft is rotated in unison with the drive shaft of the motor.

To the other end of the section 6 of the driven shaft a gear 13 is rigidly keyed. The gear 13 meshes with a pair of pinions 14. Each pinion 14 is integral with a smaller pinion 15 and the smaller pinions 15 in turn mesh with a larger gear 16 keyed to the adjacent end of the second section 7 of the driven shaft. Each pair of integral pinions 14—15 is mounted for rotation on a shaft 17 which is supported in a substantially cylindrical casing 18. This casing 18 is rotatably supported on the two sections 6 and 7 of the driven shaft of the transmission, and the side of the casing nearest the vehicle motor (thus the left hand side as viewed in Fig. 3) is formed with a hub 19 which is rotatably supported on section 6 of the driven shaft, and the other side of the casing 18 having an integral tubular extension 20 rotatably supported on section 7 of the driven shaft. As will be noted from Fig. 3 this tubular extension 20 extends almost the entire length of the section 7 of the driven shaft.

A disk 21 is keyed to the hub 19 beyond the transverse wall 3 of the transmission housing. The periphery of the disk 21 is formed with pockets (similar to the pockets 53 shown in Fig. 4), which slope in one direction and have an abrupt abutment in the other, and in which pockets locking rollers 22 are carried. These rollers engage the inner face of an annular flange 23 secured to the stationary wall 3. The purpose of the disk 21 and the rollers 22 is to prevent any rotation of the casing 18 in a direction opposite to the direction of rotation of the fly wheel and of the driven shaft, and also to permit the casing under certain circumstances to be rotated in the same direction as the motor and the driven shaft. A friction clutch 24 is mounted for slidable but nonrotatable movement on section 6 of the driven shaft, and is controlled by clutch lever 25, and is adapted to be brought into frictional engagement with the disk 21 and under such conditions to cause the casing 18 to be rotated in unison with the motor and with section 6 of the driven shaft.

From the description thus far it will be apparent that, when the motor is running and the clutch 10 is in engagement with the fly wheel 11 and when the clutch 24 is disengaged, the casing 18 would have a tendency to rotate in the opposite direction. However this is prevented by the engagement of the locking rollers 22 with the stationary flange 23. The casing 18 under such conditions therefore remains stationary and the gear 13, pinions 14 and 15, and gear 16, act as reduction gears and cause rotation to be imparted to section 7 of the driven shaft at a lower speed than section 6. When the clutch 24 is brought into engagement with disk 21, causing the casing 18 to be rotated in unison with section 6 of the driven shaft, section 7 of the driven shaft will also be rotated at the same speed. The gear 13, pinions 14 and 15, and gear 16, under such conditions will temporarily cease to function as reduction gears. These two speeds which may be imparted to section 7 of the driven shaft represent the high and low speeds of the transmission.

The means by which intervening speeds are selectively obtained will now be explained.

A gear 55 is keyed to section 7 of the driven shaft beyond the end of the tubular extension 20. This gear 55 meshes with a gear 26 keyed to the countershaft 9. A small gear 27, also keyed to counter shaft 9, meshes with a compound gear 28 rotatably mounted on the tubular extension 20. See Figs. 3 and 4. The gear 28 has an annular flange 29. A disk 30, also rotatably mounted on the tubular extension 20 adjacent the gear 28, has an annular shoulder 31 the outer periphery of which is formed with pockets 53 (Fig. 4) which slope in one direction and in which suitable locking rollers are carried. Thus, as viewed in Fig. 4, the gear 28, when rotating in clockwise direction, causes rotation of the disk 30, but the locking rollers will also permit the disk 30 to be rotated in the same direction at greater speed than the gear 28. A friction clutch 32 is slidably but nonrotatably mounted on the tubular extension 20 and is moved into or out of frictional engagement with the shouldered disk 30 by the shift lever 38.

Another gear 33, larger in diameter than the gear 27, is also keyed to the countershaft 9 and this gear meshes with a gear 34 also rotatably mounted on the tubular extension 20. The gear 34 is similar in general form to the gear 28 but is of smaller overall diameter. A shouldered disk 35, resembling the disk 30 previously described, is provided similarly with pockets and locking rollers on the periphery of its annular shoulder for engagement with gear 34, and a friction clutch 36, slidably but nonrotatably mounted on the tubular extension 20, is moved by shift lever 37 into and out of frictional engagement with the disk 35.

The operation of the mechanism thus far described will now be explained. Let it be assumed that the clutch 10 is in engagement with the fly wheel 11 of the vehicle motor but that clutches 24, 32 and 36 are out of frictional engagement with their respective companion disks. Section 6 of the driven shaft will be rotated in unison with the motor; casing 18 will remain stationary, being held against opposite rotation by the locking rollers 22; section 7 of the driven shaft will be rotated through the intermediary of the reduction gears 13, 14, 15 and 16. As previously mentioned this speed of section 7 of the driven shaft represents the low speed of the vehicle, the ratio of the lower speed to the speed of the motor depending of course on the amount of speed reduction which the reduction gears are arranged to provide. In order to step up the rotational speed of section 7 of the driven shaft the clutch 32 is brought into engagement with disk 30. Since the counter shaft 9 is rotated constantly through the intermediary of the gears 55 and 26, and since gear 28, in mesh with gear 27, is also rotated constantly in the same direction as section 7 of the driven shaft and causing rotation of disk 30, the bringing of clutch 32 into engagement with disk 30 will force rotation, in the same direction but at slower speed, of the tubular extension 20. Since the tubular extension 20 is integral with the casing 18 this also causes the casing 18 to be rotated slightly in the same direction, this rotation of the casing 18 being permitted by the locking rollers 22. However this rotation of the casing 18 increases the rotational speed of shaft section 7, in other words, it acts to reduce the difference between the speed of shaft sections 6 and 7. In order to obtain the next higher rotational speed of shaft section 7 the clutch disk 36 is now moved into frictional engagement with its cooperating disk 35. Since the disk 35 is rotated by gear 34, the result of the engagement of clutch 36 is to cause greater speed to be imparted to the tubular extension 20 and casing 18, with corresponding increased rotational speed being produced in shaft section 7. It does not matter if clutch 32 remains in frictional engagement with disk 30, which would now cause more rapid rotation to be imparted to disk 30 than to gear 28, because the locking rollers permit disk 30 to be rotated faster than gear 28.

To attain the final and highest speed the clutch 24 is now brought into frictional engagement with disk 21, causing section 7 of the driven shaft to be rotated at the same speed as section 6, as previously explained.

Thus, in the clutch transmission illustrated in Fig. 3, any one of four speeds of rotation of driven shaft section 7 may be attained. During the change from one speed to another speed the main clutch 10 remains constantly engaged so that the motor is not disconnected from the driven shaft and momentum of the vehicle does not cease during the speed changes. Furthermore when changing from one speed to the next higher speed the driven shaft section 7 continues to be driven at the previous speed until the change to the higher speed is completed. Similarly when the load on the motor becomes too great a shift to any desired lower speed can be made without disconnecting the motor entirely and thus without permitting cessation of the vehicle momentum.

On the third section 8 of the driven shaft a shifting clutch gear 39 is slidably but nonrotatably mounted. This clutch gear has a cylindrical extension or flange 40 which carries teeth on its outer perimeter and which teeth are adapted to engage with the internal teeth of the jaw 41 of gear 55, and when so engaged cause section 8 of the driven shaft to be rotated in unison with section 7. In order to enable rotation in reverse direction to be imparted to driven shaft section 8 the slidable clutch gear 39 is adapted, when shifted out of engagement with gear 55, to be brought into mesh with an intermediate gear 42 which in turn meshes with the gear 43 keyed to countershaft 9. The shifting of the clutch gear is performed by the usual clutch lever 44. Consequently the driven shaft section 8 may be rotated either in the same direction as sections 6 and 7 or in the reverse direction, but when rotated in either direction it will be subject to the same number of speed changes as driven shaft section 7. The speed at which the section 8 of the driven shaft may be rotated in reverse will not necessarily be the same as the speeds at which section 8 is rotated for forward travel of the vehicle, since the reverse speeds will depend on the relative gear ratio of the reversing gears, but at any rate the number of different speeds for driving the vehicle in reverse will be the same thus making a number of speed changes available whether the vehicle is moving forwards or backwards. For most heavy vehicles and tractors I believe it will be more practical to have the reverse speeds made less than the corresponding forward speeds. The driven shaft section 8 is connected with the vehicle wheels or with the traction belt, as the case may be, in the usual manner.

To explain the operation of the clutch transmission when the vehicle is coasting and it is desired to use the transmission as a brake and as a means of regulating and controlling coasting speed, let it be assumed that the vehicle is coasting in a forward direction down grade. If the clutch 10 remains in engagement with the motor fly wheel the motor will act as a drag on the coasting speed. If it is desired to coast in low gear the clutches 24, 32 and 36 are disconnected. To prevent the casing 18 and tubular extension 20 from rotating in the same direction with the shaft sections 6 and 7, since such rotation would be permitted by the locking rollers 22, I provide a friction brake 45 adapted to engage the casing 18 and hold it against such rotation. Under such circumstances the motor and shaft section 6 are forced to turn rapidly while shaft sections 7 and 8 turn slowly. To permit the highest coasting speed with the motor connected the brake 45 is released and the clutch 24 is thrown into engagement causing the casing 18 and shaft sections to rotate in unison at the same rate at which the motor is rotated. For the intermediate coasting speeds, since the friction clutch 32 and disk 30, and likewise the friction clutch 36 and corresponding disk 35, acting alone will not be sufficient to hold the casing 18 and tubular extension 20 from rotating too rapidly, inasmuch as the locking rollers carried by the disks 30 and 35 will permit these disks to be rotated faster than the gears 28 and 34 respectively, I provide a positive clutch gear 47, slidably but nonrotatably mounted on the tubular extension 20 and adapted to be moved in either direction by means of the shift lever 48. The clutch gear 47 has a pair of identical annular flanges 49 and 50 on opposite sides, which flanges have internal gear teeth adapted to mesh with gear teeth on the outside perimeter of the annular shoulders 51 and 52 of the gears 28 and 34 respectively. To enable the clutch gear 47 to be moved into engagement with the gear 28, for example, without necessitating any temporary disconnecting of the motor, the clutch 32 would first be moved into engagement with the disk 30 which would operate to cause the tubular extension 20 to be rotated at the same speed as gear 28 at first, whereupon the clutch gear 47 could immediately be moved into engagement with gear 28 without causing any sudden jerk or thrust on the gears and transmission.

Similarly, when it is desired to coast with the gear 34 regulating the speed of rotation of the tubular extension 20 and the casing 18, the clutch 36 is first thrown into engagement with the disk 35 to cause gear 34 and tubular extension 20 to rotate in unison, whereupon the clutch gear 47 is moved into engagement with the gear 34 in order to prevent gear 34 from being rotated faster than the tubular extension 20. The clutch gear 47 can also be used during the driving of the vehicle in either direction in the event that either of the clutches 32 or 36 should fail or should become damaged in any way.

Coasting in reverse direction would, of course, be controlled in the same manner since the direction of rotation of section 7 of the driven shaft would not be changed.

Should it be desired to have the vehicle coast with the motor disconnected from the transmission and the coasting speed still to be controlled, this can be done in either the high or intermediate speeds by using the friction brake 45 to control the rate of rotation of the casing 18 and tubular extension 20. The brake is operated by a control lever 46.

My transmission also has another feature. When the vehicle is driven up grade at any speed other than the low speed and the motor, for some reason or other, should become stalled, with the resulting tendency of the vehicle to coast backward down the grade, such coasting is entirely prevented by the transmission since any rotation of the casing in reverse direction is impossible due to the locking rollers 22. Thus it would not be necessary under such circumstances, with a vehicle equipped with my transmission, to apply the brakes to prevent the vehicle from slipping backwards when the engine became stalled going up grade. This is a problem frequently encountered by heavy trucks under such conditions, and if the brakes fail to hold the truck sufficiently against slipping backwards it becomes impossible with ordinary types of transmissions to start the vehicle again in a forward direction.

Referring to the modified or optional arrangement illustrated in Fig. 5, the countershaft 60 is mounted and driven in the same manner as countershaft 9 of Fig. 3. A small compound gear 61 is rotatably mounted on countershaft 60 and meshes with a compound gear 62 rotatably mounted on the tubular extension 20. The gear 62 has an annular flange 63. A disk 64 is keyed to the tubular extension 20 adjacent to the gear 62. The periphery of disk 64 is formed with pockets sloping in one direction, the same as the pockets 53 shown in Fig. 4. Rollers 65 are carried in these pockets, the arrangement being such that rotation of the gear 62 in one direction (thus clockwise as viewed from the left in Fig. 5), will cause rotation of the disk 64, and therewith of the tubular extension 20, but the rollers 65 will also permit the disk 64, and therewith the tubular extension 20, to be rotated in the same direction at greater speed than gear 62.

A friction clutch 66 is slidably but non-rotatably mounted on the counter shaft 60 and is moved into or out of frictional engagement with the compound gear 61 by the shift lever 67. Thus when the clutch 66 is in engagement with gear 61 the tubular extension 20 will be rotated.

Another compound gear 68, larger in diameter than gear 61, is rotatably mounted on countershaft 60 and meshes with a compound gear 69 rotatably mounted on tubular extension 20. A disk 70 is keyed to the tubular extension 20, and, like disk 64, has its periphery formed with similar pockets for carrying similar rollers, so that rotation of the gear 69 will cause rotation of the tubular extension 20 while tubular extension 20 can also rotate in the same direction at greater speed than gear 69. A friction clutch 71 is slidably but non-rotatably mounted on countershaft 60 for engagement with compound gear 68 and is moved by the shift lever 72.

The operation of the transmission in producing driving speed when the motor is in operation, clutch 10 is in engagement, and either clutch 66 or clutch 71 is in engagement with its associated gear on countershaft 60 will be apparent from the previous description, the operation being similar to that of the transmission with the corresponding elements arranged as shown in Fig. 3. The modified arrangement of Fig. 5, by enabling two of the clutch disks to be mounted on the countershaft instead of on the tubular extension 20, permits a general saving of space and may be preferred on that account. The same result is attained with either arrangement.

In the arrangement shown in Fig. 5, the clutch gear 47, slidably but non-rotatably mounted on the tubular extension 20, serves the same purpose as explained previously with reference to Fig. 3, namely, it is used when the vehicle is coasting at either of the two intermediate speeds, as previously described.

While I have shown in the accompanying drawings only two intermediate speeds between the high and low speeds provided by the transmission, obviously a greater number of speeds could be added. However, I consider that a total of four speeds available for use in either direction are sufficient for ordinary heavy vehicles including tractors. Also other clutch mechanisms might be employed in place of the simple friction clutch disks which I have shown. The particular construction of the individual parts which I have described is merely illustrative of a practical means for carrying out my invention. Further modifications might be made within the scope of the invention and it is not my intention to limit my invention otherwise than as set forth in the claims.

I claim:

1. In a transmission, a driven shaft, said shaft including a pair of sections mounted in axial alinement, means for connecting one section of said driven shaft with the vehicle motor, a gear chain connecting said first mentioned section and the second section of said driven shaft, said gear chain including planetary pinions, a rotatable casing, said planetary pinions mounted in said casing, means for connecting said casing with said first mentioned shaft section to cause said casing to be rotated in unison with said first mentioned shaft section, means holding said casing from rotating in an opposite direction from that of said first mentioned shaft section but permitting said casing to be rotated in the same direction as said first mentioned shaft section, a countershaft, means connecting said countershaft to said driven shaft to cause rotation of said countershaft, a gear secured to said countershaft, a gear rotatably carried by said casing and meshing with said countershaft gear, clutch elements connected with said casing and the gear on said casing and so arranged as to cause said casing to be rotated with said latter mentioned gear when the clutch elements are moved into engagement, locking engaging means included in said clutch elements causing said casing to be rotated with a speed not less than that of said gear on said casing when said clutch elements are moved into engaging position but permitting said casing to rotate faster than the gear on said casing when said clutch elements are in engagement, manual means for moving said clutch elements into and out of engaging position, whereby the speed of rotation of said second section of said driven shaft can be changed by varying the rotation imparted to said casing, and whereby such changes of speed can be effected without disconnecting said motor from said driven shaft.

2. In a transmission, a driven shaft, said shaft having a plurality of sections mounted in axial alinement, clutch means for connecting the first section of said driven shaft with the vehicle motor, a reduction gear chain connecting said first section and the adjoining section of said driven shaft, said gear chain including planetary pinions, a rotatable casing, said planetary pinions mounted in said casing, clutch mechanism for connecting said casing with said first shaft section, means for holding said casing against rotating in an opposite direction, a countershaft, gears connecting said countershaft to said driven shaft to cause rotation of said countershaft, a plurality of gears secured to said countershaft, said gears being of different size, a plurality of gears rotatably carried by said casing and meshing with said countershaft gears respectively, clutch elements connected with said casing and the gears on said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft.

3. In a transmission, a driven shaft, said shaft including a pair of sections mounted in axial alinement, means for connecting the first section of said driven shaft with the vehicle motor, a gear chain connecting said first section and the second section of said driven shaft, said gear chain including planetary pinions, a rotatable casing, said planetary pinions mounted in said casing, clutch mechanism for connecting said casing with said first shaft section to cause said casing to be rotated in unison with said first shaft section, means preventing said casing from rotating in an opposite direction from that of said first shaft section when said casing is disconnected from said first shaft section, a countershaft extending parallel to said driven shaft, gears connecting said countershaft to said driven shaft to cause rotation of said countershaft, a plurality of gears secured to said countershaft, said gears being of different size, a plurality of gears rotatably carried by said casing and meshing with said countershaft gears respectively, clutch elements connected with said casing and the gears on said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, said clutch elements including locking rollers permitting said casing to be rotated faster but not slower than the respectively engaged gears.

4. In a transmission, a driven shaft, said shaft comprising three sections mounted in axial alinement, clutch means for connecting the first section of said driven shaft with the vehicle motor, a reduction gear chain connecting said first section and the second section of said driven shaft, said gear chain including planetary pinions, a rotatable casing, said planetary pinions mounted in said casing, means for connecting said casing with said first shaft section to cause said casing to be rotated in unison with said first shaft section, means preventing said casing from rotating in an opposite direction from that of said first shaft section when said casing is disconnected from said first shaft section, a countershaft extending parallel to said driven shaft, means connecting said countershaft to said driven shaft to cause rotation of said countershaft, a plurality of gears secured to said countershaft, said gears being of different size, a plurality of gears rotatably carried by said casing and meshing with said countershaft gears respectively, clutch elements connected with said casing and the gears on said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, a third section of said driven shaft adjoining said second section, a clutch gear adapted when in one position to connect said second and third shaft sections for rotation in unison, a reversing gear train connected to said second section, said clutch gear adapted when moved into another position to engage said reversing gear train, whereby said third section can be subjected to the same number of speed changes when rotated in reverse direction as when rotated in the same direction as said second section.

5. In a transmission, a driven shaft, said shaft comprising three sections mounted in axial alinement, means for connecting the first section of said driven shaft with the vehicle motor, a reduction gear chain connecting said first section and the second section of said driven shaft, said gear chain including planetary pinions, a rotatable casing, said planetary pinions mounted in said casing, means for connecting said casing with said first shaft section to cause said casing to be rotated in unison with said first shaft section, means preventing said casing from rotating in an opposite direction, a countershaft extending parallel to said driven shaft, gears connecting said countershaft to said second section of said driven shaft to cause rotation of said countershaft, a plurality of gears secured to said countershaft, said gears being of different size, a plurality of gears rotatably carried by said casing and meshing with said countershaft gears respectively, clutch elements connected with said casing and the gears on said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, a third section of said driven shaft adjoining said second section, a clutch gear adapted when in one position to connect said second and third shaft sections for rotation in unison, a reversing gear train connected to said second section through the intermediary of said countershaft, said clutch gear adapted when moved into another position to engage said reversing gear train, whereby said third section can be subjected to the same number of speed changes when rotated in reverse direction as when rotated in the same direction as said second section, a brake controlling the rotation of said casing when said transmission is employed for regulating the coasting speed of the vehicle.

6. In a transmission, a driven shaft, said shaft including a pair of sections mounted in axial alinement, means for connecting one section of said driven shaft with the vehicle motor, a reduction gear chain connecting said first mentioned section and the adjoining second section of said driven shaft, said gear chain including planetary pinions, a rotatable casing, said planetary pinions mounted in said casing, said casing having a tubular portion rotatably mounted on said second adjoining shaft section, means for connecting said casing with said first mentioned shaft section to cause said casing to be rotated in unison with said first mentioned shaft section, means for holding said casing against rotating in an opposite direction from that of said first mentioned shaft section when said casing is disconnected from said first mentioned shaft section, a countershaft, means connecting said countershaft to said second section of said driven shaft to cause rotation of said countershaft, a gear secured to said countershaft, a gear rotatably carried by said tubular portion of said casing and meshing with said countershaft gear, clutch elements connected with said tubular portion of said casing and the gear on said tubular portion of said casing and so arranged as to cause said casing to be rotated with said latter mentioned gear when the clutch elements are moved into engagement, locking engaging means included in said clutch elements causing said casing to be rotated with a speed not less than that of said latter mentioned gear when said clutch elements are moved into engaging position but permitting said casing to rotate faster than the respective gear on said tubular portion when said clutch elements are in engagement, manual means for moving said clutch elements into and out of engaging position, whereby the speed of rotation of said second section of said driven shaft can be changed by varying the rotation imparted to said casing, and whereby such changes of speed can be effected without disconnecting said motor from said first section of said driven shaft.

7. In a transmission, a driven shaft, said shaft having a pair of sections mounted in axial alinement, clutch means for connecting one section of said driven shaft with the vehicle motor, a gear chain connecting said first mentioned section and the adjoining second section of said driven shaft, said gear chain including planetary pinions, a rotatable casing, said planetary pinions mounted in said casing, said casing having a hub rotatably mounted on said first mentioned section and a tubular portion rotatably mounted on said second adjoining shaft section, means for connecting said hub with said first mentioned shaft section to cause said hub to be rotated in unison with said first mentioned shaft section, means preventing said hub from rotating in an opposite direction, a countershaft extending parallel to said driven shaft, gears connecting said countershaft to said second section of said driven shaft to cause rotation of said countershaft, a plurality of gears secured to said countershaft, said gears being of different size, a plurality of gears rotatably carried by said tubular portion of said casing and meshing with said countershaft gears respectively, clutch elements connected with said tubular portion of said casing and the gears on said tubular portion of said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, said clutch elements including locking rollers permitting said tubular portion of said casing to be rotated faster but not slower than the respectively engaged gears.

8. In a transmission, a driven shaft, said shaft having three sections mounted in axial alinement, clutch means for connecting the first section of said driven shaft with the vehicle motor, a gear chain connecting said first section and the second section of said driven shaft, said gear chain including planetary pinions, a rotatable casing, said planetary pinions mounted in said casing, said casing having a hub rotatably mounted on said first section and a tubular portion rotatably mounted on said second adjoining shaft section, clutch mechanism for connecting said hub with said first shaft section to cause said hub to be rotated in unison with said first shaft section, means for holding said hub against rotating in an opposite direction, a countershaft extending parallel to said driven shaft, gears connecting said countershaft to said second section of said driven shaft to cause rotation of said countershaft, a plurality of gears secured to said countershaft, said gears being of different size, a plurality of gears rotatably carried by said tubular portion of said casing and meshing with said countershaft gears respectively, clutch elements connected with said tubular portion of said casing and the gears on said tubular portion of said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, said clutch elements including locking rollers permitting said tubular portion of said casing to be rotated faster but not slower than the respectively engaged gears, an additional clutch gear slidably but nonrotatably mounted on said tubular portion of said casing between a pair of said gears on said tubular portion of said casing and adapted selectively to engage either of said latter mentioned gears, a third section of said driven shaft adjoining said second section, a clutch gear adapted when in one position to connect said second and third shaft sections for rotation in unison, a reversing gear train connected to said second section through the intermediary of said countershaft, said latter mentioned clutch gear adapted when moved into another position to engage said reversing gear train, whereby said third section can be subjected to the same number of speed changes when rotated in reverse direction as when rotated in the same direction as said second section.

9. A transmission comprising, a driven shaft, said shaft comprising three sections mounted in axial alinement, clutch means for connecting the first section of said driven shaft with the vehicle motor, a reduction gear chain connecting said first section and the second section of said driven shaft, said gear chain including planetary pinions, a rotatable casing, said planetary pinions mounted in said casing, said casing having a tubular portion rotatably mounted on said second adjoining shaft section, means for connecting said casing with said first shaft section to cause said casing to be rotated in unison with said first shaft section, means preventing said casing from rotating in an opposite direction from that of said first shaft section when said casing is disconnected from said first shaft section, a counter-shaft extending parallel to said driven shaft, means connecting said countershaft to said second section of said driven shaft to cause rotation of said countershaft, a plurality of gears secured to said countershaft, said gears being of different size, a plurality of gears rotatably carried by said tubular portion of said casing and meshing with said countershaft gears respectively, clutch elements connected with said tubular portion of said casing and the gears on said tubular portion of said casing respectively and so arranged as to cause said casing to be rotated with said latter mentioned gears respectively when the clutch elements are moved into engagement, manual means for moving each set of said clutch elements into and out of engaging position, whereby the speed of rotation of said second section of said driven shaft can be changed by varying the rotation imparted to said casing, and whereby such changes of speed can be effected without disconnecting said motor from said first section of said driven shaft, a third section of said driven shaft adjoining said second section, a clutch gear adapted when in one position to connect said second and third shaft sections for rotation in unison, a reversing gear train connected to said second section, said clutch gear adapted when moved into another position to engage said reversing gear train, whereby said third section can be subjected to the same number of speed changes when rotated in reverse direction as when rotated in the same direction as said second section.

10. In a transmission, a driven shaft, said shaft having a pair of sections mounted in axial alinement, a gear chain connecting the first section and the second section of said driven shaft, said gear chain including planetary pinions, a rotatable casing, said planetary pinions mounted in said casing, said casing having a tubular portion rotatably mounted on said second shaft section, means for holding said casing against rotating in an opposite direction from that of said first shaft section, a counter shaft extending parallel to said driven shaft, means connecting said countershaft to said driven shaft to cause rotation of said countershaft, a gear on said countershaft and a gear on said tubular portion of said casing meshing with said countershaft gear, a clutch associated with one of said latter mentioned gears, and engaging means connected with the other of said latter mentioned gears, whereby said latter mentioned gears, through the intermediary of said clutch and latter mentioned means, can be made to cause said casing to be rotated by said countershaft and thereby increase the speed of rotation of said second section of said driven shaft.

11. In a transmission, a driven shaft, said shaft having a pair of sections mounted in axial alinement, means for connecting the first section of said driven shaft with the vehicle motor, a gear chain connecting the first section and the second section of said driven shaft, said gear chain including planetary pinions, a rotatable casing, said planetary pinions mounted in said casing, said casing having a tubular portion rotatably mounted on said second shaft section, means for connecting said casing with said first shaft section to cause said casing to be rotated in unison with said first shaft section, means for holding said casing against rotating in an opposite direction from that of said first shaft section, a counter-shaft extending parallel to said driven shaft, means connecting said countershaft to said driven shaft to cause rotation of said countershaft, a gear on said countershaft and a gear on said tubular portion of said casing meshing with said countershaft gear, a clutch associated with one of said latter mentioned gears, engaging means connected with the other of said latter mentioned gears, whereby said latter mentioned gears, through the intermediary of said clutch and latter mentioned means, can be made to cause said casing to be rotated by said countershaft and thereby increase the speed of rotation of said second section of said driven shaft, and additional means associated with one of said latter mentioned gears permitting said casing to be rotated at greater but not less speed than that caused said casing by said countershaft.

12. In a transmission, a driven shaft, said shaft including a pair of sections mounted in axial alinement, means for connecting the first section of said driven shaft with the vehicle motor, a gear chain connecting the first section and the second section of said driven shaft, said gear chain including planetary pinions, a rotatable casing, said planetary pinions mounted in said casing, means for connecting said casing with said first shaft section to cause said casing to be rotated in unison with said first shaft section, means for holding said casing against rotating in an opposite direction from that of said first shaft section, a countershaft extending parallel to said driven shaft, means connecting said countershaft to said driven shaft to cause rotation of said countershaft, a gear rotatably mounted on said countershaft, a gear rotatably carried by said tubular portion of said casing and meshing with said countershaft gear, a clutch element connected with said countershaft and the gear on said countershaft and so arranged as to cause said countershaft gear to be rotated with said countershaft when the clutch element is moved into engagement, manual means for moving said clutch element into and out of engaging position, and an engaging element on said tubular portion of said casing associated with said gear on said tubular portion, said engaging element including locking rollers permitting said tubular portion of said casing to be rotated faster but not slower than the respectively engaged gear.

13. In a transmission, a driven shaft, said shaft including a pair of sections mounted in axial alinement, clutch means for connecting the first section of said driven shaft with the vehicle motor, a reduction gear chain connecting the first section and the second section of said driven shaft, said gear chain including planetary pinions, a rotatable casing, said planetary pinions mounted in said casing, clutch mechanism for connecting said casing with said first shaft section to cause said casing to be rotated in unison with said first shaft section, means for holding said casing against rotating in an opposite direction from that of said first shaft section; a countershaft extending parallel to said driven shaft, means connecting said countershaft to said driven shaft to cause rotation of said countershaft, a plurality of gears rotatably mounted on said countershaft, said gears being of different size, a plurality of gears rotatably carried by said tubular portion of said casing and meshing with said countershaft gears respectively, clutch elements connected with said countershaft and the gears on said countershaft respectively and so arranged as to cause said countershaft gears to be rotated with said countershaft respectively when the clutch elements are moved into engagement, manual means for moving each set of said clutch elements into and out of engaging position, and engaging elements on said tubular portion of said casing associated with said gears on said tubular portion respectively, said engaging elements including locking rollers permitting said tubular portion of said casing to be rotated faster but not slower than the respectively engaged gears.

ISAAC F. DAVIDSON.

REFERENCES CITED

The following references are of record in the file of this patent:

UNITED STATES PATENTS

| Number | Name | Date |
|---|---|---|
| 1,922,965 | Lester | Aug. 15, 1933 |
| 2,381,593 | Hobbs | Aug. 7, 1945 |

FOREIGN PATENTS

| Number | Country | Date |
|---|---|---|
| 509,389 | Germany | Oct. 10, 1930 |
| 540,565 | Germany | Dec. 31, 1931 |
| 562,109 | Germany | Oct. 21, 1932 |